(12) United States Patent
Bulloni et al.

(10) Patent No.: US 11,590,739 B2
(45) Date of Patent: Feb. 28, 2023

(54) SEALING TAPE WITH A FUNCTIONAL LAYER

(71) Applicant: SIKA TECHNOLOGY AG, Baar (CH)

(72) Inventors: Matia Bulloni, Aranno (CH); Roy Z'Rotz, Ebikon (CH); Simon Schönbrodt, Sarnen (CH); Christoph Bärtsch, Walenstadt (CH); Josef Von Rotz, Kerns (CH)

(73) Assignee: SIKA TECHNOLOGY AG, Baar (CH)

( * ) Notice: Subject to any disclaimer, the term of this patent is extended or adjusted under 35 U.S.C. 154(b) by 257 days.

(21) Appl. No.: 16/768,585

(22) PCT Filed: Nov. 29, 2018

(86) PCT No.: PCT/EP2018/083051
§ 371 (c)(1),
(2) Date: May 29, 2020

(87) PCT Pub. No.: WO2019/106108
PCT Pub. Date: Jun. 6, 2019

(65) Prior Publication Data
US 2021/0170727 A1     Jun. 10, 2021

(30) Foreign Application Priority Data

Nov. 29, 2017   (EP) .................................... 17204461

(51) Int. Cl.
*B32B 27/08* (2006.01)
*C09J 7/38* (2018.01)
(Continued)

(52) U.S. Cl.
CPC ................ *B32B 27/08* (2013.01); *B32B 7/06* (2013.01); *B32B 7/12* (2013.01); *B32B 25/08* (2013.01);
(Continued)

(58) Field of Classification Search
CPC . B32B 13/02; B32B 2250/02; B32B 2250/03; B32B 2250/04; B32B 2255/10;
(Continued)

(56) References Cited

U.S. PATENT DOCUMENTS

2003/0129897 A1* 7/2003 Eleazer ..................... E04G 9/10
442/259
2004/0146681 A1   7/2004 Naipawer et al.
(Continued)

FOREIGN PATENT DOCUMENTS

CN      104533043 A  *  4/2015
EP      3 091 043 A1    11/2016
(Continued)

OTHER PUBLICATIONS

Jan. 21, 2019 International Search Report issued in International Patent Application No. PCT/EP2018/083051.
(Continued)

*Primary Examiner* — Frances Tischler
(74) *Attorney, Agent, or Firm* — Oliff PLC (57) ABSTRACT

A sealing device has a waterproofing layer, a functional layer, and an adhesive layer coated on and at least partially covering the first major surface of the waterproofing layer opposite the side of the functional layer. Also, a method produces a sealing device, a method waterproofs a substrate, and the use of the sealing device seals lapped joints formed between overlapping portions of waterproofing membranes and patches breaches in waterproofing membranes.

17 Claims, 1 Drawing Sheet

(51) Int. Cl.
*C09J 7/40* (2018.01)
*B32B 7/06* (2019.01)
*B32B 7/12* (2006.01)
*B32B 25/08* (2006.01)
*B32B 27/20* (2006.01)
*B32B 27/30* (2006.01)
*B32B 27/32* (2006.01)
*C09J 133/08* (2006.01)

(52) U.S. Cl.
CPC ............ *B32B 27/20* (2013.01); *B32B 27/302* (2013.01); *B32B 27/304* (2013.01); *B32B 27/306* (2013.01); *B32B 27/308* (2013.01); *B32B 27/322* (2013.01); *C09J 7/385* (2018.01); *C09J 7/40* (2018.01); *C09J 133/08* (2013.01); *B32B 2250/02* (2013.01); *B32B 2250/03* (2013.01); *B32B 2250/04* (2013.01); *B32B 2264/10* (2013.01); *B32B 2274/00* (2013.01); *B32B 2307/7265* (2013.01); *B32B 2307/748* (2013.01); *B32B 2419/06* (2013.01); *C09J 2203/346* (2020.08); *C09J 2301/302* (2020.08); *C09J 2301/416* (2020.08)

(58) Field of Classification Search
CPC ............ B32B 2255/26; B32B 2264/10; B32B 2274/00; B32B 2307/7265; B32B 2307/748; B32B 2419/00; B32B 2419/06; B32B 25/08; B32B 25/14; B32B 27/08; B32B 27/20; B32B 27/28; B32B 27/30; B32B 27/302; B32B 27/304; B32B 27/306; B32B 27/308; B32B 27/32; B32B 27/322; B32B 27/34; B32B 7/06; B32B 7/12; C09J 133/08; C09J 2203/346; C09J 2301/302; C09J 2301/416; C09J 7/385; C09J 7/40; E04B 1/6806; E04B 1/6812; E04D 5/146; E04D 5/148

See application file for complete search history.

(56) References Cited

U.S. PATENT DOCUMENTS

| | | | | |
|---|---|---|---|---|
| 2011/0217528 | A1* | 9/2011 | Wiercinski | ............... E04B 1/66 428/351 |
| 2015/0231863 | A1* | 8/2015 | Knebel | .................. B32B 27/36 428/355 R |

FOREIGN PATENT DOCUMENTS

| | | | |
|---|---|---|---|
| GB | 1 422 123 | A | 1/1976 |
| KR | 20160053736 | A * | 5/2016 |
| WO | 2017/108843 | A1 | 6/2017 |
| WO | 2017/108846 | A1 | 6/2017 |

OTHER PUBLICATIONS

Jan. 21, 2019 Written Opinion of the International Searching Authority issued in International Patent Application No. PCT/EP2018/083051.

* cited by examiner

SEALING TAPE WITH A FUNCTIONAL LAYER

TECHNICAL FIELD

The invention relates to the field of waterproofing of above and below ground building constructions by using sealing devices. In particular, the invention relates to sealing tapes, which can be used for sealing of polymeric membrane joints and lapped areas, for detailing of various surfaces, and for patching of breaches in polymeric membranes.

BACKGROUND OF THE INVENTION

In the field of construction, polymeric sheets, which are often referred to as membranes or panels, are used for sealing of underground and above ground constructions, such as basements, tunnels, and flat and low-sloped roofs, against penetration water. Such waterproofing membranes can be provided as single-ply or multi-ply systems. A single-ply waterproofing membrane is composed of single waterproofing layer, which can be reinforced with a reinforcement layer such as a scrim, mesh or fabric layer to improve the dimensional stability of the membrane. A multi-ply waterproofing membrane is composed of multiple waterproofing layers of different or similar materials. The membranes are typically delivered to a construction site in rolls, transferred to the place of installation, unrolled, and adhered on the surface of the substrate to be waterproofed.

Commonly used materials for the waterproofing membranes include thermoplastics such as plasticized polyvinylchloride (p-PVC), thermoplastic olefins (TPE-O, TPO), and elastomers such as ethylene-propylene diene monomer (EPDM). One of the drawbacks of polymer-based membranes is their poor bonding properties; they typically show low bonding strength to adhesives that are commonly used in the construction industry, such as epoxy adhesives, polyurethane adhesives, and cementitious compositions. Therefore, a contact layer, for example, a fleece backing, is typically used to provide sufficient bonding of the polymer-based waterproofing membrane and the structure to be waterproofed.

In post-applied waterproofing applications, the membrane is bonded via its contact layer to the surface of the concrete substrate to be waterproofed whereas in pre-applied waterproofing applications the membrane is laid out before the concrete structure to be waterproofed is built. A post-applied waterproofing membrane is adhered on the substrate to be waterproofed with an adhesive or by using a sealing tape. A pre-applied waterproofing membrane is placed with its waterproofing layer against an underlying structure or formwork and fresh concrete is cast against the surface of the contact layer, thereby fully and permanently bonding the membrane to the surface of the hardening concrete. An adhesive is typically used between the waterproofing layer and the contact layer to improve bonding on the fresh concrete cast against the contact layer. The adhesive should, therefore, enable the fresh concrete to penetrate deeply into to contact layer before hardening in order to provide high resistance to penetrating water.

In order to create a continuous waterproofing seal, the edges of adjacent waterproofing membranes are overlapped to form sealable joints. These joints can then be sealed by bonding the bottom surface of an overlapping edge to the top surface of another overlapping edge or by using sealing tapes to bridge the joint between the overlapping edges. The basic construction of a sealing tape is typically similar to that of the waterproofing membrane. Consequently, sealing tapes used for sealing joints between pre-applied waterproofing membranes comprise a thermoplastic waterproofing layer and a contact layer, for example, a fleece backing, which adhesively bonded on one side of the membrane. Depending on the material of the waterproofing membranes, the waterproofing layer of the sealing tape can be bonded to the membranes by heat-welding or by using an adhesive. These types of sealing tapes can also be used for detailing applications, in which the joints formed between two adjacent below or above ground constructions have to be sealed against penetration of water.

A significant disadvantage of the State-of-the-Art sealing tapes is the relatively complex built-up of the tape, which increases the production costs of such tapes. There thus remains a need for a sealing tape, which can be produced at lower cost than the State-of-the-Art sealing tapes and which is particularly suitable for use in sealing joints and patching breaches in pre-applied waterproofing systems.

SUMMARY OF THE INVENTION

The object of the present invention is to provide a sealing device, in particular a sealing tape, which can be used for sealing joints between overlapping edges of polymeric waterproofing membranes and for patching of breaches in polymeric waterproofing membranes.

Figure 1:
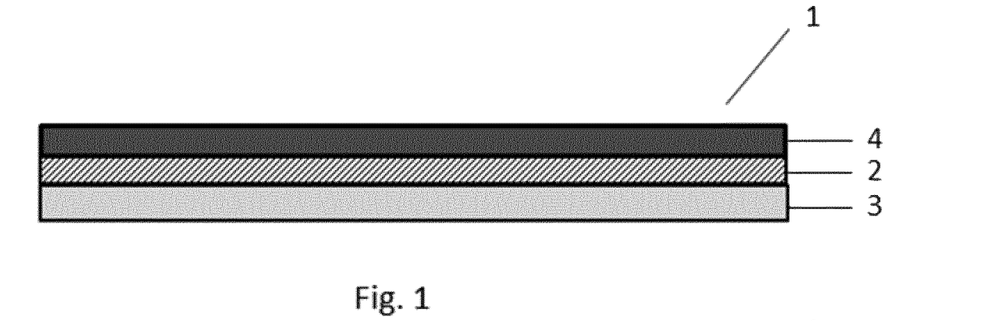
FIG. 1 shows a cross-section of a sealing device (1) comprising a waterproofing layer (2), a functional layer (3), and an adhesive layer (4) coated on and covering the first major surface of the waterproofing layer (2) opposite to the side of the functional layer (3).
Figure 2:
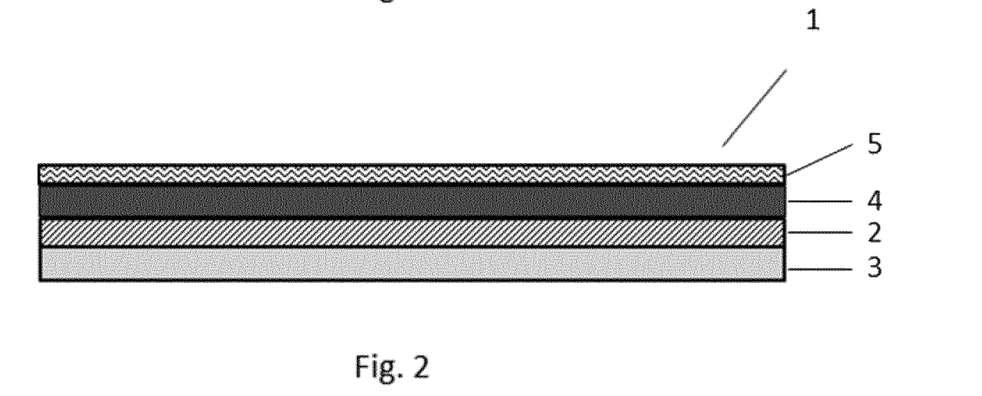
FIG. 2 shows a cross-section of a sealing device (1) comprising a waterproofing layer (2), a functional layer (3), an adhesive layer (4) coated on and covering the first major surface of the waterproofing layer (2) opposite to side of the functional layer (3), and a release liner (5) covering the outward facing surface of adhesive layer (4) opposite the side of the waterproofing layer (2).
Figure 3:
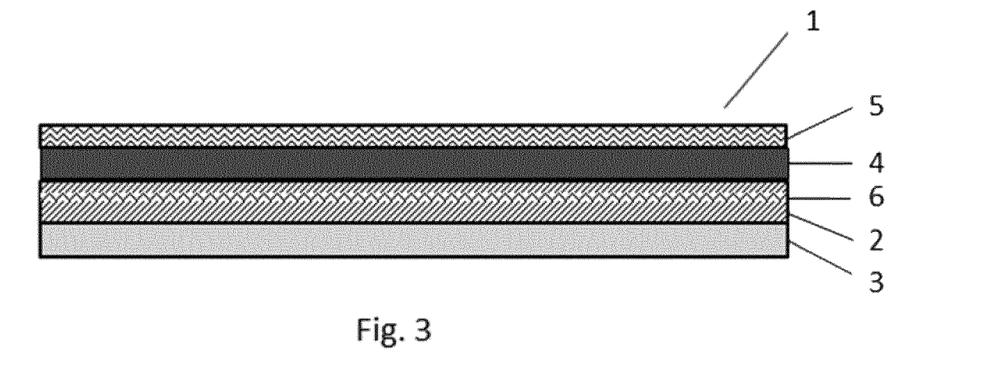
FIG. 3 shows a cross-section of a sealing device (1) comprising a waterproofing layer (2), a functional layer (3), an adhesive layer (4) coated on and covering the first major surface of the waterproofing layer (2) opposite to the side of the functional layer (3), and a release liner (5) covering the outward facing surface of adhesive layer (4) opposite the side of the waterproofing layer (2). In this embodiment, the sealing device (1) further comprises a reinforcement layer (6), which is fully embedded into the waterproofing layer (2).

The subject of the present invention is a sealing device comprising a waterproofing layer (2) having first and second major surfaces and comprising at least one thermoplastic polymer P1 and a functional layer (3) having first and second major surfaces and comprising:

a) 10-70 wt.-% of at least one thermoplastic polymer P2 and b) 30-90 wt.-% of at least one solid particulate filler F, said proportions being based on the total weight of the functional layer (3), wherein the functional layer (3) and the waterproofing layer (2) are at directly or indirectly connected over at least part of their opposing major surfaces and wherein the sealing device further comprises an adhesive layer (4) coated on and at least partially covering the first major surface of the waterproofing layer opposite to side of the functional layer (3).

It was surprisingly found out that the fiber-based contact layer of a State-of-the-Art sealing tape can be replaced with a functional layer comprising at least one thermoplastic polymer and at least one solid particulate filler to provide good bonding with cementitious compositions after hardening and with adhesives commonly used in the construction industry.

One of the advantages of the sealing device of the present invention is that it can be produced with lower costs than State-of-the-Art sealing tapes comprising thermoplastic waterproofing layer and a fiber-based contact layer.

Other aspects of the present invention are presented in other independent claims. Preferred aspects of the invention are presented in the dependent claims.

DETAILED DESCRIPTION OF THE INVENTION

The subject of the present invention is a sealing device comprising a waterproofing layer having first and second major surfaces and comprising at least one thermoplastic polymer P1 and a functional layer having first and second major surfaces and comprising:

a) 10-70 wt.-% of at least one thermoplastic polymer P2 and b) 30-90 wt.-% of at least one solid particulate filler F, said proportions being based on the total weight of the functional layer, wherein the functional layer and the waterproofing layer are at directly or indirectly connected over at least part of their opposing major surfaces and wherein the sealing device further comprises an adhesive layer coated on and at least partially covering the first major surface of the waterproofing layer opposite the side of the functional layer.

Substance names beginning with "poly" designate substances which formally contain, per molecule, two or more of the functional groups occurring in their names. For instance, a polyol refers to a compound having at least two hydroxyl groups. A polyether refers to a compound having at least two ether groups.

The term "polymer" designates a collective of chemically uniform macromolecules produced by a polyreaction (polymerization, polyaddition, polycondensation) where the macromolecules differ with respect to their degree of polymerization, molecular weight and chain length. The term also comprises derivatives of said collective of macromolecules resulting from polyreactions, that is, compounds which are obtained by reactions such as, for example, additions or substitutions, of functional groups in predetermined macromolecules and which may be chemically uniform or chemically non-uniform.

The term "elastomer" refers to any natural, synthetic, or modified high molecular weight polymer or combination of polymers, which is capable of recovering from large deformations, i.e. has elastic properties. The elastomer can be, or already is, modified to a state in which it is essentially insoluble (but can swell) in a boiling solvent. The term "elastomer" may be used interchangeably with the term "rubber."

The term "(meth)acrylic" designates methacrylic or acrylic. Accordingly, (meth)acryloyl designates methacryloyl or acryloyl. A (meth)acryloyl group is also known as (meth)acryl group. A (meth)acrylic compound can have one or more (meth)acryl groups, such as mono- di-, tri- etc. functional (meth)acrylic compounds.

The term "molecular weight" refers to the molar mass (g/mol) of a molecule or a part of a molecule, also referred to as "moiety". The term "average molecular weight" refers to number average molecular weight ($M_n$) of an oligomeric or polymeric mixture of molecules or moieties. The molecular weight may be determined by gel permeation chromatography.

The term "glass transition temperature" refers to the temperature measured by DSC according to ISO 11357 standard above which temperature a polymer component becomes soft and pliable, and below which it becomes hard and glassy. The measurements can be performed with a Mettler Toledo 822e device at a heating rate of 2 degrees centigrade/min. The $T_g$ values can be determined from the measured DSC curve with the help of the DSC software.

The term "softening point" refers in the present document to a temperature at which compound softens in a rubber-like state, or a temperature at which the crystalline portion within the compound melts. The softening point can be measured by a ring and ball method according to DIN EN 1238.

The "amount or content of at least one component X" in a composition, for example "the amount of the at least one thermoplastic polymer P" refers to the sum of the individual amounts of all thermoplastic polymers P contained in the composition. For example, in case the composition comprises 20 wt.-% of at least one thermoplastic polymer P, the sum of the amounts of all thermoplastic polymers P contained in the composition equals 20 wt.-%.

The term "room temperature" designates a temperature of 23° C.

The waterproofing layer and functional layer are preferably planar elements having first and second major surfaces, i.e. top and bottom surfaces, defined by peripheral edges and defining a thickness there between. The term "planar element" refers in the present document to sheet-like elements having a length and width at least 50 times, preferably at least 100 times, more preferably at least 250 times, greater than the thickness of the element. The functional layer and the waterproofing layer are at directly or indirectly connected over at least part of their opposing major surfaces. It may, however, be preferable that substantially the entire area of the first major surface of the functional layer is directly or indirectly connected to the second major surface of the waterproofing layer. It may also be preferable that the functional layer and the waterproofing layer have substantially same width and length.

According to one or more embodiments, the waterproofing layer and the functional layer are directly connected to each other over at least part of their opposing major surfaces. The expression "directly connected" is understood to mean in the context of the present invention that no further layer or substance is present between the layers, and that the opposing surfaces of the two layers are directly bonded to each other or adhere to each other. At the transition area between the two layers, the materials forming the layers can also be present mixed with each other. It may also be preferable that substantially the entire first major surface of the functional layer is directly connected to the second major surface of the waterproofing layer. It may for example be preferable that at least 90%, more preferably at least 95%, of the first major surface of the functional layer is directly connected to the second major surface of the waterproofing layer.

Preferably, the functional layer comprises a heterogeneous mixture of at least two discrete phases, in particular a continuous thermoplastic polymer phase and a discontinuous solid filler phase. The continuous thermoplastic polymer phase comprises the at least one thermoplastic polymer P2 and optionally one or more other polymer materials and/or additives that can be mixed or interspersed sufficiently with the at least one thermoplastic polymer P2 so as to essentially constitute a single "thermoplastic polymer phase". The thermoplastic polymer phase is characterized as generally being capable of forming a melt by heating to above a specified temperature and then re-solidifying when cooled sufficiently. Due to the presence of the thermoplastic phase, the functional layer is weldable with other layers comprising thermoplastic polymers, which are compatible with the at least one thermoplastic polymer P2.

The discontinuous solid filler phase comprises the at least one solid particulate filler F, which may be present in the functional layer as individual particles or as aggregates of one or more particles. These are at least partially, preferably completely, surrounded by the continuous thermoplastic phase, i.e. the solid particulate filler F is dispersed into the continuous thermoplastic polymer phase. In case the functional layer contains one or more mineral binders, such as cement, it is essential that these do not form interconnected solid networks of hydrated mineral binders. It may be preferable that the functional layer is essentially free, more preferably completely free, of interconnected solid networks of hydrated mineral binders. The particles of the at least one solid particulate filler F will not generally undergo a phase change by heating, at least not at temperatures at which the thermoplastic polymer phase forms a melt. Instead, the particles of the solid particulate filler F will remain as a discrete discontinuous solid phase interspersed among the continuous thermoplastic phase. The particles of the at least one solid particulate filler F may be dispersed throughout the matrix formed by the at least one thermoplastic polymer P2.

Preferably, the particles of the at least one solid particulate filler F are distributed throughout the entire volume of the functional layer. The term "distributed throughout the entire volume" in understood to mean that the at least one solid filler F is present in essentially all portions of the functional layer but it does not necessarily imply that the distribution is uniform throughout the functional layer. It may, however, be preferable that the at least one solid particulate filler F is uniformly distributed throughout the entire volume of the functional layer. For a person skilled in the art it is clear that even if the at least one solid particulate filler F is "uniformly distributed", there may be regions in the functional layer, which have a slightly higher concentration of the at least one solid particulate filler F than other regions and that a 100% uniform distribution is generally not achievable.

The sealing device further comprises an adhesive layer coated on an at least partially covering the first major surface of the waterproofing layer. The expression "coated on the first major surface of the waterproofing layer" is understood to mean that the adhesive layer has been applied directly on the first major surface of the waterproofing layer, i.e. the adhesive layer and the waterproofing layer are directly connected to each other over their opposing surfaces.

According to one or more embodiments, the adhesive coated on the first major surface of the waterproofing layer is a pressure sensitive adhesive (PSA) or a pressure sensitive hot-melt adhesive (HM-PSA). The term "pressure sensitive adhesive" designates in the present disclosure viscoelastic adhesive materials, which adhere instantaneously to most substrates with the application of slight pressure and remain permanently tacky. The term "pressure sensitive hot-melt adhesive (HM-PSA)" designates in the present disclosure a class of pressure sensitive adhesives, which are applied as a hot-melt adhesive.

Suitable pressure sensitive adhesives and pressure sensitive hot-melt adhesives include, for example, compositions based on acrylic polymers, styrene block copolymers, amorphous poly-α-olefins (APAO), vinyl ether polymers, elastomers such as, for example, butyl rubber, ethylene vinyl acetate, natural rubber, nitrile rubber, silicone rubber, and ethylene-propylene-diene rubber. In addition to the above mentioned polymers, suitable pressure sensitive and pressure sensitive hot-melt adhesive compositions typically comprise one or more additional constituents including, for example, tackifying resins, waxes, fillers, and plasticizers as wells as one or more additives such as, for example, UV-light absorption agents, UV- and heat stabilizers, optical brighteners, pigments, dyes, and desiccants.

According to one or more embodiments, the adhesive is a styrene block copolymer-based adhesive, preferably a styrene block copolymer-based pressure sensitive adhesive or a styrene block copolymer-based pressure sensitive hot-melt adhesive, comprising at least one styrene block copolymer.

Suitable styrene block copolymers include block copolymers of the SXS type, in each of which S denotes a non-elastomer styrene (or polystyrene) block and X denotes an elastomeric α-olefin block, which may be polybutadiene, polyisoprene, polyisoprene-polybutadiene, completely or partially hydrogenated polyisoprene (poly ethylene-propylene), completely or partially hydrogenated polybutadiene (poly ethylene-butylene). The elastomeric α-olefin block preferably has a glass transition temperature in the range from −55° C. to −35° C. The elastomeric α-olefin block may also be a chemically modified α-olefin block. Particularly suitable chemically modified α-olefin blocks include, for example, maleic acid-grafted α-olefin blocks and particularly maleic acid-grafted ethylene-butylene blocks.

Preferably, the at least one styrene block copolymer is selected from the group consisting of SBS, SIS, SIBS, SEBS, and SEPS block copolymers. These can have a linear, radial, diblock, triblock or star structure, linear structure being preferred. Suitable styrene block copolymers of the SXS type include block copolymers based on saturated or unsaturated middle blocks X. Hydrogenated styrene block copolymers are also suitable. The at least one styrene block copolymer may be present in the styrene block copolymer-based adhesive in an amount of 5-60 wt.-%, more preferably 10-55 wt.-%, most preferably 20-50 wt.-%, based on the total weight of the adhesive.

The styrene block copolymer-based adhesive preferably comprises at least one tackifying resin. The term "tackifying resin" refers in the present document to resins that in general enhance the adhesion and/or tackiness of an adhesive composition. The term "tackiness" refers in the present document to the property of a substance of being sticky or adhesive by simple contact. The tackiness can be measured, for example, as a loop tack. Preferred tackifying resins are tackifying at a temperature of 25° C.

Suitable tackifying resins include synthetic resins, natural resins, and chemically modified natural resins. The at least one tackifying resin may be present in the styrene block copolymer-based adhesive in an amount of 5-60 wt.-%, preferably 10-55 wt.-%, most preferably 20-50 wt.-%, based on the total weight of the adhesive.

Examples of suitable natural resins and chemically modified natural resins include rosins, rosin esters, phenolic modified rosin esters, and terpene resins. The term "rosin" is to be understood to include gum rosin, wood rosin, tall oil rosin, distilled rosin, and modified rosins, for example dimerized, hydrogenated, maleated and/or polymerized versions of any of these rosins.

Suitable terpene resins include copolymers and terpolymers of natural terpenes, such as styrene/terpene and alpha methyl styrene/terpene resins; polyterpene resins obtainable from the polymerization of terpene hydrocarbons, such as the bicyclic monoterpene known as pinene, in the presence of Friedel-Crafts catalysts at moderately low temperatures; hydrogenated polyterpene resins; and phenolic modified terpene resins including hydrogenated derivatives thereof.

The term "synthetic resin" refers in the present document to compounds obtained from the controlled chemical reactions such as polyaddition or polycondensation between well-defined reactants that do not themselves have the characteristic of resins. Monomers that may be polymerized to synthesize the synthetic resins may include aliphatic monomer, cycloaliphatic monomer, aromatic monomer, or mixtures thereof. Aliphatic monomers can include $C_4$, $C_5$, and $C_6$ paraffins, olefins, and conjugated diolefins. Examples of aliphatic monomers or cycloaliphatic monomers include butadiene, isobutylene, 1,3-pentadiene, 1,4-pentadiene, cyclopentane, 1-pentene, 2-pentene, 2-methyl-1-pentene, 2-methyl-2-butene, 2-methyl-2-pentene, isoprene, cyclohexane, 1-3-hexadiene, 1-4-hexadiene, cyclopentadiene, and dicyclopentadiene. Aromatic monomers can include $C_8$, $C_9$, and $C_{10}$ aromatic monomer, such as styrene, indene, derivatives of styrene, derivatives of indene, coumarone and combinations thereof.

In particular, suitable synthetic resins include synthetic hydrocarbon resins made by polymerizing mixtures of unsaturated monomers that are obtained as by-products of cracking of natural gas liquids, gas oil, or petroleum naphthas. Synthetic hydrocarbon resins obtained from petroleum based feedstocks are referred in the present document as "petroleum hydrocarbon resins". These include also pure monomer aromatic resins, which are made by polymerizing aromatic monomer feedstocks that have been purified to eliminate color causing contaminants and to precisely control the composition of the product. Petroleum hydrocarbon resins typically have a relatively low average molecular weight ($M_n$), such in the range of 250-5,000 g/mol and a glass transition temperature of above 0° C., preferably equal to or higher than 15° C., more preferably equal to or higher than 30° C.

It may be preferable that the at least one tackifying resin is selected from the group consisting of C5 aliphatic petroleum hydrocarbon resins, mixed C5/C9 aliphatic/aromatic petroleum hydrocarbon resins, aromatic modified C5 aliphatic petroleum hydrocarbon resins, cycloaliphatic petroleum hydrocarbon resins, mixed C5 aliphatic/cycloaliphatic petroleum hydrocarbon resins, mixed C9 aromatic/cycloaliphatic petroleum hydrocarbon resins, mixed C5 aliphatic/cycloaliphatic/C9 aromatic petroleum hydrocarbon resins, aromatic modified cycloaliphatic petroleum hydrocarbon resins, and C9 aromatic petroleum hydrocarbon resins as well hydrogenated versions of the aforementioned resins. The notations "C5" and "C9" indicate that the monomers from which the resins are made are predominantly hydrocarbons having 4-6 and 8-10 carbon atoms, respectively. The term "hydrogenated" includes fully, substantially and at least partially hydrogenated resins. Partially hydrogenated resins may have a hydrogenation level, for example, of 50%, 70%, or 90%.

According to one or more embodiments, the adhesive is a rubber-based adhesive, preferably a rubber-based pressure sensitive adhesive or a rubber-based pressure sensitive hot-melt adhesive, comprising at least one elastomer.

Suitable elastomers for the rubber-based adhesive include, for example, butyl rubber, halogenated butyl rubber, ethylene-propylene rubber, ethylene-propylene diene monomer rubber, natural rubber, chloroprene rubber, synthetic 1,4-cis-polyisoprene, polybutadiene, isoprene-butadiene copolymer, methyl methacrylate-butadiene copolymer, methyl methacrylate-isoprene copolymer, acrylonitrile-isoprene copolymer, and acrylonitrile-butadiene copolymer, and silicone rubber. According to one or more embodiments, the at least one elastomer is selected from the group consisting of butyl rubber, halogenated butyl rubber, ethylene-propylene rubber, ethylene-propylene diene monomer rubber, natural rubber, chloroprene rubber, synthetic 1,4-cis-polyisoprene, polybutadiene, and isoprene-butadiene copolymer, preferably from the group consisting of butyl rubber, halogenated butyl rubber, natural rubber, and chloroprene rubber.

According to one or more embodiments, the at least one elastomer is present in the rubber-based adhesive in an amount of 5-70 wt.-%, preferably 10-60 wt.-%, more preferably 10-55 wt.-%, even more preferably 15-50 wt.-%, based on the total weight of the adhesive.

The rubber-based adhesive preferably further comprises at least one tackifying resin, preferably selected from the group consisting of synthetic resins, natural resins, and chemically modified natural resins. According to one or more embodiments, the at least one tackifying resin is present in the rubber-based pressure sensitive adhesive in an amount of 2.5-60 wt.-%, preferably 5-55 wt.-%, more preferably 5-50 wt.-%, even more preferably 10-45 wt.-%, based on the total weight of the adhesive.

Suitable tackifying resins to be used in the rubber-based adhesive include, in particular, the petroleum hydrocarbon resins described above as suitable for the styrene block copolymer-based adhesives. Preferably, the at least one tackifying resin contained in the rubber-based adhesive is a petroleum hydrocarbon resin having a softening point determined by using the Ring and Ball method as defined in DIN EN 1238 standard of at least 75° C., preferably at least 85° C., in particular in the range of 75-180° C., preferably 80-160° C.

According to one or more embodiments, the rubber-based adhesive further comprises at least one at 25° C. liquid polyolefin resin, preferably selected from the group consisting of at 25° C. liquid polybutene and polyisobutylene. The term "at 25° C. liquid polybutene" refers in the present document to low molecular weight olefin oligomers comprising isobutylene and/or 1-butene and/or 2-butene. The ratio of the C4-olefin isomers can vary by manufacturer and by grade. When the C4-olefin is exclusively 1-butene, the material is referred to as "poly-n-butene" or "PNB". The term "at 25° C. liquid polyisobutylene" refers in the present document to low molecular weight polyolefins and olefin oligomers of isobutylene. Suitable at 25° C. liquid polybutene and polyisobutylene have a number average molecular weight ($M_n$) of less than 15,000 g/mol, preferably less than 5,000 g/mol, even more preferably less than 1,000 g/mol.

Suitable commercially available at 25° C. liquid polybutenes and polyisobutylenes include, for example, Indopol® H-300 and Indopol® H-1200 (from Ineos); Glissopal® V230, Glissopal® V500, and Glissopal® V700 (from BASF); Dynapak® poly 230 (from Univar GmbH, Germany); and Daelim® PB 950 (from Daelim Industrial).

According to one or more embodiments, the at least one at 25° C. liquid polyolefin resin is present in the rubber-based adhesive in an amount of 2.5-55 wt.-%, preferably 5-50 wt.-%, more preferably 5-50 wt.-%, even more preferably 10-45 wt.-%, based on the total weight of the adhesive.

According to one or more embodiments, the rubber-based adhesive further comprises at least one filler, preferably selected from the group consisting of calcium carbonate, clay, expanded clay, diatomaceous earth, pumice, mica, kaolin, talc, dolomite, xonotlite, perlite, vermiculite, Wollastonite, barite, magnesium carbonate, magnesium silicate, precipitated silica, fumed silica, glass beads, hollow glass spheres, ceramic spheres, bauxite, and zeolites, more preferably from the group consisting of calcium carbonate, clay, expanded clay, diatomaceous earth, pumice, mica, kaolin, talc, dolomite, xonotlite, perlite, vermiculite, Wollastonite, barite, magnesium carbonate, magnesium silicate, precipitated silica, and fumed silica.

According to one or more embodiments, the at least one filler is present in the rubber-based adhesive in an amount of 5-80 wt.-%, preferably 10-75 wt.-%, more preferably 15-70 wt.-%, even more preferably 15-65 wt.-%, based on the total weight of the adhesive.

According to one or more embodiments, the adhesive is an acrylic-based adhesive, preferably an acrylic-based pressure sensitive adhesive or an acrylic-based pressure sensitive hot-melt adhesive, comprising at least one acrylate polymer.

Suitable acrylate polymers include homopolymers, copolymers and higher inter-polymers of acrylic monomers optionally with one or more other ethylenically unsaturated monomers. Preferably, the acrylate polymer has been prepared by using a monomer mixture comprising at least 65 wt.-%, more preferably 75 wt.-%, most preferably 85 wt.-%, based on the total weight of the monomer mixture, of acrylic monomers of the following formula (I);

where $R_1$ is a hydrogen or a methyl group and $R_2$ is a hydrogen or an alkyl group having from 2 to 30, preferably from 2 to 9, carbon atoms. The alkyl groups are preferably selected from the group consisting of branched, unbranched, cyclic, acyclic, and saturated alkyl groups.

It may be preferable that the acrylate polymer is obtainable by radical polymerization of a mixture comprising at least 65 wt.-%, more preferably 75 wt.-%, most preferably 85 wt.-%, based on the total weight of the mixture, of one or more acrylic monomers of the formula (I).

Examples of especially suitable acrylic monomers include, for example, methyl acrylate, methyl methacrylate, ethyl acrylate, n-butyl acrylate, n-butyl methacrylate, n-pentyl acrylate, n-hexyl acrylate, n-heptyl acrylate, n-octyl acrylate, n-octyl methacrylate, n-nonyl acrylate, lauryl acrylate, stearyl acrylate, behenyl acrylate, and their branched isomers, as for example isobutyl acrylate, 2-ethylhexyl acrylate, 2-ethylhexyl methacrylate, isooctyl acrylate, isooctyl methacrylate, and also cyclohexyl methacrylate, isobornyl acrylate, isobornyl methacrylate or 3,5-dimethyladamantyl acrylate.

It may be preferable that the mixture from which the at least one acrylate polymer is prepared further comprises up to 15 wt.-%, preferably at least 35 wt.-%, of comonomers in the form of vinyl compounds, preferably one or more vinyl compounds selected from the group consisting of vinyl esters, vinyl halides, vinylidene halides, ethylenically unsaturated hydrocarbons with functional groups, and nitriles of ethylenically unsaturated hydrocarbons. Acrylic compounds containing functional groups, for example, hydroxyl groups and hydroxyalkyl groups are also embraced by the term "vinyl compound". Suitable vinyl compounds include, for example, maleic anhydride, styrene, styrenic compounds, (meth)acrylamides, N-substituted (meth)acrylamides, acrylic acid, beta-acryloyloxypropionic acid, vinylacetic acid, fumaric acid, crotonic acid, aconitic acid, dimethylacrylic acid, trichloroacrylic acid, itaconic acid, vinyl acetate, hydroxyalkyl (meth)acrylate, amino-group-containing (meth)acrylates, and hydroxyl group-containing (meth)acrylates.

According to one or more further embodiments, the at least one acrylate polymer has been prepared by using a reactant mixture comprising:

a) at least 65 wt.-%, preferably at least 75 wt.-%, of one or more acrylic monomers of the formula (I) where $R_1$ is a hydrogen or a methyl group and $R_2$ is an alkyl group having from 2 to 9, carbon atoms, and b) 0-20 wt.-%, preferably 2.5-15 wt.-%, of at least one vinyl compound selected from the group consisting of (meth)acrylic acid, beta-acryloyloxypropionic acid, vinylacetic acid, fumaric acid, crotonic acid, aconitic acid, dimethylacrylic acid, trichloroacrylic acid, itaconic acid, vinyl acetate, and hydroxyalkyl (meth)acrylates.

It may be preferable that the at least one acrylate polymer has an average molecular weight $M_n$ in the range of 50,000 to 1,000,000 g/mol, such as 100,000 to 750,000 g/mol, more preferably from 150,000 to 500,000 g/mol. Preferably the at least one acrylate polymer has a glass transition temperature $T_g$ of less than 0° C., more preferably less than −10° C., most preferably less than −25° C.

According to one or more embodiments, the adhesive is an at least partially crosslinked acrylic-based adhesive, preferably an at least partially crosslinked acrylic-based pressure sensitive adhesive or an at least partially crosslinked acrylic-based pressure sensitive hot-melt adhesive. These types of adhesives have been found out to be useful in providing sealing devices, which have broader operating window in terms of minimum and maximum application temperature. In particular, such adhesives have been found out to maintain their adhesive strength at higher temperatures compared to non-crosslinked acrylic-based adhesives. In addition, the at least partially crosslinked acrylic-based adhesive compositions have been found out to allow adjustments in the formulation to achieve greater tackiness even at low temperatures.

According to one or more embodiments, the adhesive is an at least partially crosslinked composition of:

a') At least 65.0 wt.-%, preferably at least 85.0 wt.-%, of the at least acrylate polymer, b') 0.01-5.0 wt.-%, preferably 0.1-1.0 wt.-%, of at least one curing agent, c') 0.1-5.0 wt.-%, preferably 0.25-2.5 wt.-%, of at least one initiator, and d') 0-30.0 wt.-%, preferably 5.0-20.0 wt.-%, of at least one tackifying resin, all proportions being based on the total weight of the composition.

The at least one curing agent is preferably a multifunctional acrylate selected from the group consisting of butanediol dimethacrylate, ethyleneglycol dimethacrylate, diethyleneglycol dimethacrylate, triethyleneglycol dimethacrylate, trimethylolpropane trimethacrylate, butanediol diacrylate, hexanediol diacrylate, trimethylolpropane triacrylate, and tripropyleneglycol diacrylate, trimethylolpropane ethoxy triacrylate, trimethylolpropane triacrylate, tripropylene glycol diacrylate, propylene glycol dimethacrylate, dipropylene glycol diacrylate, dipentaerythritol hydroxy pentaacrylate, neopentyl glycol propoxylate diacrylate, bisphenol A ethoxylate dimethacrylate, alkoxylated hexanediol diacrylate, ethoxylated bisphenol A diacrylate, ethoxylated bisphenol A dimethacrylate, ethoxylated trimethylolpropane triacrylate, propoxylated neopentyl glycol diacrylate, propoxylated glyceryl triacrylate, polybutadiene diacrylate, and polybutadiene dimethacrylate.

According to one or more embodiments, the adhesive an UV-curable acrylic-based adhesive, preferably an UV-curable pressure sensitive adhesive or an UV-curable acrylic-based pressure sensitive hot-melt adhesive, that has been at least partially crosslinked by use of UV-radiation.

According to one or more embodiments, the at least one initiator c') contained in above presented crosslinkable composition is a photo initiator. Suitable photoinitiators include, for example, benzoin ethers, dialkoxyacetophenones, alpha-hydroxycyclohexyl aryl ketones, alpha-ketophenylacetate esters, benzyldialkylketals, chloro- and alkylthioxanthones and alpha-amino- and alpha-hydroxyalkyl aryl ketones.

Preferably, the first major surface of the waterproofing layer is coated with a continuous adhesive layer. The term "continuous layer" refers in the present document to layers consisting of one single area coated with the adhesive whereas a "discontinuous layer" is considered to consist of several isolated areas coated with the adhesive.

Preferred thickness of the adhesive layer depends on the embodiment of the sealing device, in particular on the type of the adhesive. It may be preferable that the adhesive layer has a thickness of 0.1-2.5 mm, preferably 0.2-2.0 mm, more preferably 0.2-1.5 mm, most preferably 0.3-1.0 mm. The thickness of the adhesive layer can be determined by using the measurement method as defined in DIN EN 1849-2 standard. According to one or more embodiments, the adhesive layer has uniform thickness such that the difference between measured thicknesses of the adhesive layer at any two points on the surface of the waterproofing layer is not more than 0.15 mm, preferably not more than 0.075 mm, most preferably not more than 0.05 mm.

The outward facing surface of the adhesive layer opposite the side of the waterproofing layer is preferably at least partially, preferably completely, covered with a release liner to prevent premature unwanted adhesion and to protect the adhesive layer from moisture, fouling, and other environmental factors. In case the sealing device is provided in form of rolls, the release liner enables ease of unwind without sticking of the adhesive to the back side of the sealing device. The release liner may also be sliced into multiple sections to allow portioned detachment of the liner from the adhesive layer.

Suitable materials for the release liner include Kraft paper, polyethylene coated paper, silicone coated paper as well as polymeric films, for example, polyethylene, polypropylene, and polyester films coated with polymeric release agents selected from silicone, silicone urea, urethanes, waxes, and long chain alkyl acrylate release agents.

The waterproofing layer comprises at least one thermoplastic polymer P1.

The detailed composition of the waterproofing layer is not particularly restricted but should be as waterproof as possible and not to decompose or be mechanically damaged even under prolonged influence of water or moisture. Preferably, the at least one thermoplastic polymer P1 is present in the waterproofing layer in an amount of at least 80 wt.-%, preferably at least 85 wt.-%, more preferably at least 90 wt.-%, most preferably at least 95 wt.-%, based on the total weight of the waterproofing layer.

The at least one thermoplastic polymer P1 and P2 are preferably selected from the group consisting of ethylene-vinyl acetate copolymer (EVA), ethylene-acrylic ester copolymers, ethylene-α-olefin co-polymers, ethylene-propylene co-polymers, propylene-α-olefin co-polymers, propylene-ethylene copolymers, polypropylene (PP), polyethylene (PE), polyvinylchloride (PVC), polyethylene terephthalate (PET), polystyrene (PS), polyamides (PA), chlorosulfonated polyethylene (CSPE), ethylene propylene diene rubber (EPDM), and polyisobutylene (PIB). According to one or more embodiments, the at least one thermoplastic polymer P1 and P2 are selected from the group consisting of low-density polyethylene, linear low-density polyethylene, high-density polyethylene, ethylene-vinyl acetate copolymer (EVA), ethylene-acrylic ester copolymers, ethylene-α-olefin co-polymers, and ethylene-propylene co-polymers. According to one or more embodiments, the at least one thermoplastic polymer P1 and P2 are selected from the group consisting of propylene-α-olefin co-polymers, propylene-ethylene copolymers, and polypropylene (PP).

Preferably, the at least one thermoplastic polymer P1 is miscible with the at least one thermoplastic polymer P2 contained in the functional layer. More preferably, the at least one thermoplastic polymer P1 is weldable with the at least one thermoplastic polymer P2. The polymers being "weldable" with each other means here that a thermoplastic layer consisting of the at least one thermoplastic polymer P1 can be homogenously joined by heat welding with another thermoplastic layer consisting of the at least one thermoplastic polymer P2. According to one or more embodiments, the at least one thermoplastic polymer P1 and the at least one thermoplastic polymer P2 are identical.

The functional layer comprises 10-70 wt.-%, preferably 20-60 wt.-%, more preferably 30-55 wt.-%, most preferably 35-50 wt.-%, based on the total weight of the functional layer, of at least one thermoplastic polymer P2.

The functional layer also comprises 30-90 wt.-%, preferably 40-80 wt.-%, more preferably 45-70 wt.-%, most preferably 50-65 wt.-%, based on the total weight of the functional layer, of at least one solid particulate filler F. Preferably, the at least one solid particulate filler F is a mineral filler selected from inert mineral fillers and mineral binders.

The term "inert mineral filler" designates mineral fillers, which, unlike mineral binders are not reactive with water, i.e. do not undergo a hydration reaction in the presence of water. Suitable inert mineral filler to be used in the functional layer include sand, granite, calcium carbonate, clay, expanded clay, diatomaceous earth, pumice, mica, kaolin, talc, dolomite, xonotlite, perlite, vermiculite, Wollastonite, barite, magnesium carbonate, calcium hydroxide, calcium aluminates, silica, fumed silica, fused silica, aerogels, glass beads, hollow glass spheres, ceramic spheres, bauxite, comminuted concrete, and zeolites.

The term "sand" refers in the present document to mineral clastic sediments (clastic rocks) which are loose conglomerates (loose sediments) of round or angular small grains, which were detached from the original grain structure during the mechanical and chemical degradation and transported to their deposition point, said sediments having an $SiO_2$ content of greater than 50 wt.-%, in particular greater than 75 wt.-%, particularly preferably greater than 85 wt.-%. The term "calcium carbonate" as inert mineral filler refers in the present document to calcitic fillers produced from chalk, limestone or marble by grinding and/or precipitation.

According to one or more embodiments, the at least one solid particulate filler F is an inert mineral filler selected from the group consisting of sand, granite, calcium carbonate, clay, expanded clay, diatomaceous earth, pumice, mica, kaolin, talc, dolomite, xonotlite, perlite, vermiculite, Wollastonite, barite, magnesium carbonate, calcium hydroxide, calcium aluminates, silica, fumed silica, fused silica, aerogels, glass beads, hollow glass spheres, ceramic spheres, bauxite, comminuted concrete, and zeolites.

According to one or more embodiments, the functional layer comprises 10-80 wt.-%, preferably 25-75 wt.-%, more preferably 30-70 wt.-%, most preferably 35-65 wt.-%, based on the total weight of the functional layer, of at least one inert mineral filler, preferably selected from the group consisting of comminuted concrete, calcium carbonate, diatomaceous earth, pumice, mica, kaolin, talc, dolomite, xonotlite, perlite, vermiculite, Wollastonite, barite, magnesium carbonate.

The term "mineral binder" refers in the present document to a binder, which in the presence of water reacts in a hydration reaction under formation of solid hydrates or hydrate phases. In particular, the term "mineral binder" refers in the present document to non-hydrated mineral binders, i.e. mineral binders, which have not been mixed with water and reacted in a hydration reaction. Suitable mineral binders to be used in the functional layer include hydraulic, non-hydraulic, latent hydraulic, and pozzolanic binders.

According to one or more embodiments, the at least one solid particulate filler F is a mineral binder selected from the group consisting of hydraulic, non-hydraulic, latent hydraulic, and pozzolanic binders.

The term "hydraulic binder" designates in the present document substances that harden as a result of chemical reactions with water ("hydration reactions") and produce hydrates that are not water-soluble. In particular, the hydration reactions of the hydraulic binder take essentially place independently of the water content. This means that hydraulic binders can harden and retain their strength even when exposed to water, for example underwater or under high humidity conditions. Examples of hydraulic binders include cement, cement clinker and hydraulic lime. In contrast, "non-hydraulic binders" such as air-slaked lime (non-hydraulic lime) and gypsum, are at least partially water soluble and must be kept dry in order to retain their strength. The term "gypsum" designates in the present document any known form of gypsum, in particular calcium sulfate dehydrate, calcium sulfate α-hemihydrate, calcium sulfate β-hemihydrate, or calcium sulfate anhydrite or mixtures thereof.

The term "latent hydraulic binder" designates in the present document particular type II concrete additives with latent hydraulic character according to DIN EN 206-1:2000. These materials are calcium aluminosilicates that are not able to harden directly or harden too slowly when mixed with water. The hardening process is accelerated in the presence of alkaline activators, which break the chemical bonds in the binder's amorphous (or glassy) phase and promote the dissolution of ionic species and the formation of calcium aluminosilicate hydrate phases. Examples of latent hydraulic binders include granulated blast furnace slag.

The term "pozzolanic binders" designates in the present document in particular type II concrete additives with pozzolanic character according to DIN EN 206-1:2000. These materials are siliceous or aluminosilicate compounds that react with water and calcium hydroxide to form calcium silicate hydrate or calcium aluminosilicate hydrate phases. Pozzolanic binders include natural pozzolans such as trass and artificial pozzolans such as fly ash and silica fume.

According to one or more embodiments, the functional layer comprises 10-80 wt.-%, preferably 25-75 wt.-%, more preferably 30-70 wt.-%, most preferably 35-65 wt.-%, based on the total weight of the functional layer, of cement or cement clinker. The cement can be any conventional cement, for example, one in accordance with the five main cement types according to DIN EN 197-1: namely, Portland cement (CEM I), Portland composite cements (CEM II), blast-furnace cement (CEM III), pozzolan cement (CEM IV) and composite cement (CEM V). These main cement types are subdivided, depending on the amount added, into an additional 27 cement types, which are known to the person skilled in the art and listed in DIN EN 197-1. Naturally, all other cements that are produced according to another standard are also suitable, for example, according to ASTM standard or Indian standard. To the extent that reference is made here to cement types according to DIN standard, this naturally also relates to the corresponding cement compositions which are produced according to another cement standard.

According to one or more embodiments, the functional layer comprises 1-60 wt.-%, preferably 2.5-55 wt.-%, more preferably 5-50 wt.-%, most preferably 10-40 wt.-%, of at least one inert mineral filler selected from the group consisting of sand, granite, calcium carbonate, clay, expanded clay, diatomaceous earth, pumice, mica, kaolin, talc, dolomite, xonotlite, perlite, vermiculite, Wollastonite, barite, magnesium carbonate, calcium hydroxide, calcium aluminates, silica, fumed silica, fused silica, aerogels, glass beads, hollow glass spheres, ceramic spheres, bauxite, comminuted concrete, and zeolites, and 1-60 wt.-%, preferably 2.5-55 wt.-%, more preferably 5-50 wt.-%, most preferably 10-40 wt.-%, of at least one mineral binder selected from the group consisting of hydraulic, non-hydraulic, latent hydraulic, and pozzolanic binders, in particular cement and cement clinker, all proportions being based on the total weight of the functional layer.

According to one or more embodiments, the functional layer comprises 1-60 wt.-%, preferably 2.5-55 wt.-%, more preferably 5-50 wt.-%, most preferably 10-40 wt.-%, of comminuted concrete and 1-60 wt.-%, preferably 2.5-55 wt.-%, more preferably 5-50 wt.-%, most preferably 10-40 wt.-%, of at least one other inert mineral filler and/or at least one mineral binder selected from the group consisting of hydraulic, non-hydraulic, latent hydraulic, and pozzolanic binders, in particular cement and cement clinker, all proportions being based on the total weight of the functional layer.

It has been found that the mineral binders, if present in the functional layer, remain in a substantially non-hydrated state even if the sealing device is stored for several weeks at normal room temperature and relative humidity of 50%. However, even if the functional layer contains hydrated mineral binders, for example, in case the at least one solid particulate filler contains or consists of comminuted concrete, it is essential that the hydrated mineral binders do not form interconnected solid networks. The presence of solid networks of hydrated mineral binders in the functional layer would significantly reduce the flexibility of the sealing device, which is not desired in waterproofing and roofing applications.

Preferably, the median particle size $d_{50}$ of the at least one solid particulate filler F is 1-300 μm, more preferably 1-250 μm, even more preferably 2-200 μm, most preferably 2-150 μm. The term "median particle size $d_{50}$" refers in the present document to a particle size below which 50% of all particles by volume are smaller than the $d_{50}$ value. The term "particle size" refers to the area-equivalent spherical diameter of a particle. The particle size distribution can be measured by laser diffraction according to the method as described in standard ISO 13320:2009. For determination of the particle size distribution, the particles are suspended in water (wet dispersion method). A Mastersizer 2000 device (trademark of Malvern Instruments Ltd, GB) can be used in measuring particle size distribution.

Preferably, the overall particle size of the solid particulate filler F (of at least 98 of the particles) is below 250 μm, more preferably below 200 μm, even more preferably below 100 μm. It may also be preferable that less than 40 wt.-%, more preferably less than 30 wt.-%, even more preferably less than 20-wt.-%, most preferably less than 10 wt.-% of the particles of the at least one solid particulate filler F have a particle size of less than 5 μm and/or that less than 40 wt.-%, more preferably less than 30 wt.-%, even more preferably less than 20-wt.-%, most preferably less than 10 wt.-% of the particles of the at least one solid particulate filler F have a particle size of above 100 μm.

The functional layer may further comprise one or more surfactants. The term "surfactant" refers in the present document to surface tension lowering substances, which are usually organic compounds containing both hydrophobic and hydrophilic groups. Based on the charge of the hydrophilic group the surfactants are typically classified to anionic, cationic, amphoteric, non-ionic surfactants.

According to one or more embodiments, the functional layer further comprises at least one surfactant SF selected from the group consisting of anionic, cationic, amphoteric, non-ionic, and polymeric surfactants.

Examples of suitable anionic surfactants include surfactants containing carboxylate, sulfate, phosphate or sulfonate groups, such as amino acid derivatives; fatty alcohol ether sulfates; fatty alcohol sulfates; soaps; alkylphenol ethoxylates; fatty alcohol ethoxylates; alkanesulfonates; olefinsulfonates; and alkyl phosphates.

Examples of suitable cationic surfactants include quaternary ammonium or phosphonium compounds, such as, for example, tetraalkylammonium salts; N,N-dialkylimidazoline compounds; dimethyldistearylammonium compounds, N-alkylpyridine compounds; and ammonium chlorides.

Amphoteric (zwitterionic) surfactants have both cationic and anionic centers attached to the same molecule. Examples of suitable amphoteric surfactants include amphoteric electrolytes such as aminocarboxylic acid and betaines.

Examples of suitable non-ionic surfactants include ethoxylates, such as, for example, ethoxylated adducts of alcohols, such as polyoxyalkylene polyols; amines; fatty acids; fatty acid amides; alkylphenols; ethanolamides; fatty amines; polysiloxanes; fatty acid esters; alkyl or alkylphenyl polyglycol ethers, such as, for example, fatty alcohol polyglycol ethers; alkylglycosides; sugar esters; sorbitan esters; polysorbates or trialkylamine oxides; esters and amides of poly(meth)acrylic acids with polyalkylene glycols or aminopolyalkylene glycols, which at most may be tacked at one end with alkyl groups.

Polymeric surfactants can be divided into two groups of compounds. The first group includes comb or rake polymers where there is an organic polymeric chain with hydrophobic groups at regular intervals along the chain and hydrophilic groups at random or regular intervals along that chain. The second group of polymeric surfactants includes block co-polymers where there are blocks of hydrophobic groups (B) and blocks of hydrophilic groups (A) usually in A-B-A configuration. Certain polymeric surfactants such as ethylene oxide-propylene oxide co-polymer surfactants can also be classified as non-ionic surfactants.

According to one or more embodiments, the at least one surfactant SF is present in the functional layer in an amount of at least 0.05 wt.-%, based on the total weight of the functional layer. It may be advantageous that the at least one surfactant SF is present in the functional layer in an amount of 0.1-5.0 wt.-%, preferably 0.1-4.0 wt.-%, more preferably 0.1-3.0 wt.-%, most preferably 0.25-2.0 wt.-%, based on the total weight of the functional layer.

It may be preferable that the at least one surfactant SF is selected from the group consisting of glycerol monostearates, polycarboxylate ethers, polyether-modified polysiloxanes, polyalkylene oxide siloxanes, hydroxyethyl amines, erucamides, stearyl stearamides, alkali metal alkanesulfonates, and alkyl aryl sulfonates.

Examples of suitable commercially available glycerol monostearates include Dimodan HP (from Danisco).

Examples of suitable polycarboxylate ethers include polycarboxylate ether-based superplasticizers (PCEs), which are composed by a methoxy-polyethylene glycol copolymer (side chain) grafted with methacrylic acid copolymer (main chain). Suitable commercially available polycarboxylate ether-based superplasticizers include Viscocrete® Polymer PC-2, Viscocrete® Polymer RMC-2, and Cemerol® R-750 MC (from Sika).

Examples of suitable polyether-modified polysiloxanes include polyetherpolysiloxane copolymers. Suitable commercially available polyether-modified polysiloxanes include Tegostab B8870 (from Evonik).

Examples of suitable commercially available polyalkylene oxide siloxanes include Niax L-1500 (from Momentive).

Examples of suitable hydroxyethyl amines include bis(2-hydroxyethyl) amines, which are commercially available as Armostat 300 (from Akzo Nobel).

Examples of suitable commercially available erucamides and stearyl stearamides include Kemamide E180 and Kemamide80 (from PMC Biogenix).

Examples of suitable alkali metal alkanesulfonates include sodium alkanesulfonates, which are commercially available as Armostat 3002 (from Akzo Nobel) and Loxiol 93P (from Emery Oleochemicals).

Examples of suitable commercially available alkylarylsulfonates include ZetaSphere 2300, 3100 and 3700 (from Airproducts).

According to one or more embodiments, the functional layer comprises at least one surfactant SF selected from the group consisting of glycerol monostearates, polycarboxylate ethers, polyether-modified polysiloxanes, polyalkylene oxide siloxanes, hydroxyethyl amines, erucamides, stearyl stearamides, alkali metal alkanesulfonates, and alkyl aryl sulfonates, wherein the at least one surfactant SF is present in the functional layer in an amount of 0.1-5.0 wt.-%, preferably 0.1-4.0 wt.-%, more preferably 0.1-3.0 wt.-%, most preferably 0.25-2.0 wt.-%, based on the total weight of the functional layer.

The thickness of the functional layer is not particularly restricted and it may not be constant in the longitudinal and/or transverse direction of the sealing device.

Preferably, the functional layer has a maximum thickness, determined by using the measurement method as defined in DIN EN 1849-2 standard, of 0.1-2.5 mm, more preferably 0.1-2.0 mm, even more preferably 0.1-1.5 mm, most preferably 0.1-1.0 mm. It may also be preferable that the functional layer has a minimum thickness, determined by using the measurement method as defined in DIN EN 1849-2 standard, of 0.05-2.5 mm, more preferably 0.05-2.0 mm, even more preferably 0.05-1.5 mm, most preferably 0.05-1.0 mm. Furthermore, it may be advantageous that the functional layer has an average thickness, calculated as arithmetic average of the maximum and minimum thicknesses, determined by using the measurement method as defined in DIN EN 1849-2 standard, of 0.075-2.5 mm, preferably 0.1-2.0 mm, even more preferably 0.1-1.5 mm, most preferably 0.1-1.0 mm.

The thickness of the waterproofing layer is not particularly restricted. The waterproofing layer may have a thickness, determined by using the measurement method as defined in DIN EN 1849-2 standard, of 0.05-2.5 mm, preferably 0.05-1.5 mm, even more preferably 0.1-1.0 mm, most preferably 0.1-0.5 mm.

The sealing device may further comprise a reinforcement layer in order to improve the dimensional stability of the sealing device. The reinforcement layer is preferably at least partially embedded into the waterproofing layer. Suitable reinforcement layers include, for example, reinforcing scrims and reinforcing fiber materials.

Any kind of reinforcing scrims commonly used for improving the dimensional stability of thermoplastic waterproofing membranes can be used. Typically such reinforcing scrims comprise a mesh of interwoven strands, which comprises or are composed of plastic or metal material. Suitable reinforcing scrims have a tensile strength sufficient to resist tearing when exposed to typical tensile loads experienced by waterproofing membranes from various directions. Particularly suitable materials for the reinforcing scrim layer include, for example, polypropylene, polyethylene terephthalate (PET), and polyester.

The term "fiber material" refers in the present document to materials composed of fibers. The fibers can comprise or consist of organic or synthetic material. These include, in particular, cellulose fibers, cotton fibers, protein fibers, synthetic organic fibers, and synthetic inorganic fibers. Suitable synthetic fibers include fibers made of polyester, a homopolymer or copolymer of ethylene and/or propylene, viscose, nylon, and glass. The fibers can be short fibers or long fibers, spun, woven or unwoven fibers or filaments. The fibers can moreover be aligned or drawn fibers. Moreover, it may be advantageous to use different fibers, both in terms of geometry and composition, together. The reinforcing fiber material can be in the form of a fiber mat, a nonwoven fabric, or a fibrous tissue. Particularly suitable materials for the reinforcing fiber material include glass fibers, polyester fibers, and nylon fibers.

According to one or more embodiments, the sealing device comprises a reinforcement layer, which is fully embedded into the waterproofing layer. By the expression "fully embedded" is meant that the reinforcement layer is substantially fully covered by the matrix of the waterproofing layer.

According to one or more further embodiments, the sealing device comprises a reinforcement layer, which is located between the waterproofing layer and the functional layer. In these embodiments, one side of the reinforcement layer is preferably directly connected to the second surface of the waterproofing layer the other side being directly connected to the first surface of the functional layer. It is also possible that the reinforcement layer is partially embedded into the waterproofing layer and/or into the functional layer. It may, however, be also possible or even preferred that the sealing device does not contain any reinforcement layers.

The sealing device is typically provided in a form of a prefabricated tape, which is delivered to the construction site and unwound from rolls to provide strips having a width of typically 1-20 cm. The strips can be used, for example, to seal joints between two adjacent waterproofing membranes or for repairing damaged locations in existing waterproofing membranes.

The preferences given above for the waterproofing layer, the functional layer, the adhesive layer, the reinforcement layer, the release liner, and for the at least one thermoplastic polymers P1 and P2 as well as for the at least one solid particulate filler F, apply equally to all aspects of the present invention unless otherwise stated.

Another subject of the present invention is a method for producing a sealing device of the present invention. The method for producing a sealing device is not particularly limited and any conventional technology suitable for producing composite membranes comprising polymer based sheets and films can be used.

The sealing device of the present invention can be produced, for example, by using conventional extruding, calendering, compressing, or casting techniques. Preferably, the method for producing a sealing device of the present invention comprises extruding and/or calendering and/or co-extruding compositions of the waterproofing layer and the functional layer. The "compositions" of the waterproofing layer and functional layer comprise all the constituents needed to form the respective layers.

Preferably, the method for producing a sealing device of the present invention comprises steps of:

i) Extruding and/or calendering and/or co-extruding compositions of the waterproofing layer and the functional layer to form a membrane composite, ii) Providing an adhesive composition and optionally heating the adhesive composition to allow the adhesive composition to flow, and iii) Coating the adhesive composition onto the first major surface of the waterproofing layer opposite the side of the functional layer such that the first major surface is at least partially covered by an adhesive layer.

According to one or more embodiments, step i) comprises steps of:

i') Co-extruding compositions of the waterproofing layer and the functional layer through a common die to form a membrane composite, or i') Extruding a composition of the waterproofing layer through a die to form the waterproofing layer and i") Extruding a composition of the functional layer through a die onto the surface of the waterproofing layer to form a membrane composite or i') Extruding a composition of the functional layer through a die to form the functional layer and i") Extruding a composition of the waterproofing layer through a die onto the surface of the functional layer to form a membrane composite.

In an extrusion step, composition of the corresponding layer is first melt-processed in an extruder to produce a homogenized melt, which is then extruded through an extruder die. Suitable extrusion apparatuses comprising at least one extruder and an extruder die are well known to a person skilled in the art. Any conventional extruder, for example, a ram extruder, single screw extruder, or a twin-screw extruder may be used. Preferably, the extruder is a screw extruder, more preferably a twin-screw extruder. The extruder die, preferably a flat die, consists of manifold, approach, and lip regions. In case of a co-extrusion process, an extruder apparatus comprising at least two extruders, preferably twin-screw extruders, and a single manifold or a multi manifold die, can be used. Alternatively to the co-extrusion process, step i) can be conducted using two separate extruder apparatuses each comprising an extruder and a die, preferably a flat die.

The extrusion temperature is preferably 80-250° C., more preferably 100-240° C., even more preferably 120-220° C., most preferably 140-200° C. The term "extrusion temperature" refers to the temperature of the extruded composition in the die outlet. Preferably, the extrusion pressure is 20-350 bar, preferably 30-240 bar, more preferably 35-200 bar, most preferably 40-130 bar. The "extrusion pressure" refers to the pressure of the composition at the end of the metering zone just before the composition enters the die inlet.

According to one or more embodiments, the method for producing a sealing device comprises a further step of employing spaced apart calender cooling rolls through which the membrane composite obtained in step i) is drawn before application of the adhesive. The membrane composite is drawn through the calender cooling rolls in order to ensure that the layers are bonded to each other and/or to control the thickness of the extruded layers, in particular the thickness of the functional layer.

In case the composition of the functional layer contains one or more mineral binders, the amount of water contained in the composition, if present, should be low enough to keep the mineral binders in essentially non-hydrated form during the melt-processing and extrusion/calendering steps. Hydration of the mineral binders during the production process is not desired since it would significantly reduce the flexibility of the functional layer due to the formation of interconnected solid networks of hydrated mineral binders. Flexibility of the functional layer is essential in order to provide sealing devices, which can be stored and transported in form of rolls and which can be easily applied on the surface of the substrate to be waterproofed.

According to one or more preferred embodiments, the amount of water in the composition of the functional layer is not more than 5 wt.-%, preferably not more than 2.5 wt.-%, more preferably not more than 1 wt.-%, most preferably not more than 0.5 wt.-%, based on the total weight of the composition of the functional layer.

The adhesive composition may be applied onto the first major surface of the waterproofing layer by using any conventional means such as by die coating, extrusion coating, roller coating, or by spray lamination techniques, preferably by die coating. Whether or not the adhesive composition is heated in step ii) depends on the embodiment of the sealing device, in particular on the type of the adhesive. In case the adhesive is a pressure sensitive hot-melt adhesive, it may be preferable that the adhesive composition is heated to a temperature in the range of 50-150° C., such as 75-125° C., in particular 80-120° C. In case the adhesive is a pressure sensitive adhesive, it is preferred that the adhesive composition is not heated in step ii) of the method.

The adhesive composition may be applied only on part or on the entire area of the first major surface of the waterproofing layer. It may also be preferable that the adhesive composition is applied over substantially the entire area of the first major surface of the waterproofing layer. It may, for example, be preferable that the adhesive composition is applied over at least 80%, more preferably at least 90%, most preferably at least 95%, of the area of the first major surface of the waterproofing layer.

According to one or more embodiments, the adhesive composition is a rubber-based adhesive, preferably a rubber-based pressure sensitive adhesive or a rubber-based pressure sensitive hot-melt adhesive, comprising at least one elastomer.

According to one or more embodiments, the at least one elastomer is present in the rubber-based adhesive in an amount of 5-70 wt.-%, preferably 10-60 wt.-%, based on the total weight of the adhesive and the rubber-based adhesive further comprises at least one tackifying resin and at least one at 25° C. liquid polyolefin resin and/or at least one filler. Preferred tackifying resins, at 25° C. liquid polyolefin resins, and fillers and their respective amounts in the rubber-based adhesive have already been presented above in context of the sealing device of the present invention.

According to one or more embodiments, the adhesive composition is an acrylic-based adhesive, preferably an acrylic-based pressure sensitive adhesive or an acrylic-based pressure sensitive hot-melt adhesive, comprising at least one acrylate polymer. Preferred acrylate polymers to be used in the acrylic-based adhesive have already been presented above in context of the sealing device of the present invention.

According to one or more embodiments, the adhesive composition is an at least partially crosslinked acrylic-based adhesive, preferably an at least partially crosslinked acrylic-based pressure sensitive adhesive or an at least partially crosslinked acrylic-based pressure sensitive hot-melt adhesive.

According to one or more embodiments, the adhesive composition is an at least partially crosslinked composition of:

a') At least 65.0 wt.-%, preferably at least 85.0 wt.-%, of the at least acrylate polymer, b') 0.01-5.0 wt.-%, preferably 0.1-1.0 wt.-%, of at least one curing agent, c') 0.1-5.0 wt.-%, preferably 0.25-2.5 wt.-%, of at least one initiator, and d') 0-30.0 wt.-%, preferably 5.0-20.0 wt.-%, of at least one tackifying resin, all proportions being based on the total weight of the composition.

According to one or more embodiments, the adhesive composition is an UV-curable acrylic-based adhesive, preferably an UV-curable pressure sensitive adhesive or an UV-curable acrylic based pressure sensitive hot-melt adhesive and the method for producing a sealing device comprises a further step of:

iv) Subjecting adhesive layer to UV-radiation to effect crosslinking of the adhesive composition.

According to one or more embodiments, the adhesive composition is an UV-curable composition comprising:

a") At least 65.0 wt.-%, preferably at least 85.0 wt.-%, of the at least acrylate polymer, b") 0.01-5.0 wt.-%, preferably 0.1-1.0 wt.-%, of at least one curing agent, c") 0.1-5.0 wt.-%, preferably 0.25-2.5 wt.-%, of at least one photo-initiator, and d") 0-30.0 wt.-%, preferably 5.0-20.0 wt.-%, of at least one tackifying resin, all proportions being based on the total weight of the UV-curable composition.

According to one or more embodiments, the method for producing a sealing device comprises a further step of:

v) Applying a release liner to the outward facing surface of the adhesive layer opposite the side of the waterproofing layer.

Another subject of the present invention is a method for waterproofing a substrate comprising steps of:

i) Providing first and second waterproofing membranes having inner and outer surfaces, ii) Positioning said waterproofing membranes on surface of the substrate such that the inner surfaces of said membranes are facing the surface of the substrate and the end portions of membranes are overlapped to form a lapped joint between the membranes, iii) Applying a sealing device according to the present invention to and over the lapped joint such that the adhesive layer is directly contacted with at least portion of the outer surface of the first and the second waterproofing membrane on both sides of the lapped joint, and iv) Pressing the sealing device against the outer surfaces of the first and second waterproofing membranes with a pressure sufficient to affect adhesive bonding.

The opposing surfaces of the end portions of the waterproofing membranes, i.e. the outer surface of end portion of the first membrane and the inner surface of the end portion of the second membrane, are preferably bonded together.

Depending on the properties of the waterproofing membranes, the end portions can be bonded together, for example, by adhesive means or by means of heat-welding. In some cases the surfaces of the waterproofing membranes have to be pre-treated to enable adhesive bonding.

According to one or more embodiments, each of the first and second waterproofing membranes comprises a waterproofing layer having first and second major surfaces and comprising at least one thermoplastic polymer P1 and a functional layer having first and second major surfaces and comprising:

a) 10-70 wt.-% of at least one thermoplastic polymer P2 and b) 30-90 wt.-% of at least one solid particulate filler F, said proportions being based on the total weight of the functional layer, wherein the functional layer and the waterproofing layer are at directly or indirectly connected over at least part of their opposing major surfaces.

In these embodiments, the inner surface of the first and second waterproofing membranes corresponds to the first major surface of the waterproofing layer of the first and second waterproofing membranes, i.e. first and second waterproofing membranes are positioned on the surface of the substrate such that waterproofing layers are facing the surface of the substrate.

It may be preferable that the waterproofing layer and the functional layer of the first and the second waterproofing membrane are directly connected to each other over at least part of their opposing major surfaces. It may also be preferable that substantially the entire first major surface of the functional layer is directly connected to the second major surface of the waterproofing layer. It may for example be preferable that at least 90%, more preferably at least 95%, of the first major surface of the functional layer is directly connected to the second major surface of the waterproofing layer.

Still another subject of the present invention is use of the sealing device of the present invention for sealing lapped joints formed between overlapping portions of polymeric membranes, preferably waterproofing membranes and for patching of breaches in polymeric membranes, preferably waterproofing membranes.

DETAILED DESCRIPTION OF THE DRAWINGS

FIG. 1 shows a cross-section of an embodiment of the sealing device (1) comprising a waterproofing layer (2) having first and second opposed major surfaces, a functional layer (3) having first and second opposed major surfaces, and an adhesive layer composition (4) coated on the first major surface of the waterproofing layer (2). In this embodiment, substantially the entire first major surface of the functional layer (3) is directly connected to the second major surface of the waterproofing layer (2).

FIG. 2 shows cross-section of an embodiment of the sealing device (1) comprising a waterproofing layer (2), a functional layer (3), an adhesive layer composition (4) coated on the first major surface of the waterproofing layer (2), and a release liner (5) covering substantially the entire outward facing surface of the adhesive layer (4) opposite the side of the waterproofing layer (2). In this embodiment, substantially the entire first major surface of the functional layer (3) is directly connected to the second major surface of the waterproofing layer (2).

FIG. 3 shows a cross-section of an embodiment of the sealing device (1) comprising a waterproofing layer (2), a functional layer (3), an adhesive layer composition (4) coated on the first major surface of the waterproofing layer, a release liner (5) covering substantially the entire outward facing surface of the adhesive layer (4) opposite the side of the waterproofing layer (2), and a reinforcement layer (6) fully embedded into the waterproofing layer (2)

Example

Preparation of Sealing Devices

Sealing devices were produced by providing a membrane composite comprising a waterproofing layer and a functional layer and coating an adhesive composition on the outer surface of the waterproofing layer. The membrane composites were prepared by following the procedure as described the published patent application WO 2017/108843 A1 (pages 39-40; Example 1, "Preparation of the example membranes"). The thickness of the waterproofing layer was ca. 0.5 mm and the thickness of the functional was ca. 0.4 mm.

The adhesive compositions were applied on the surface of the waterproofing layer by using a roller coating apparatus with or without heating. In case the adhesive was a pressure sensitive hot-melt adhesive, the adhesive composition was first heated to allow it to flow and then applied on the surface of the waterproofing layer. In case of an UV-curable pressure sensitive adhesive, the adhesive composition was first applied on the surface of the waterproofing layer to form an adhesive layer, which was subjected to UV-radiation to effect crosslinking of the adhesive composition.

Four different adhesives were used in preparation of the sealing devices:

Adhesive1: UV-curable acrylate-based pressure sensitive adhesive comprising:

60-85 wt.-% of at least one acrylate polymer, 0.01-1.0 wt.-% of a curing agent, 0.1-3 wt.-% of an initiator, and 2.5-25 wt.-% of a tackifying resin Adhesive2: Thermoplastic elastomer-based pressure sensitive hot-melt adhesive (SikaMelt 9209HT, available from Sika Automotive GmbH, Germany)

Adhesive3: Butyl rubber-based pressure sensitive hot-melt adhesive comprising:

5-40 wt.-% of a butyl rubber, 5-40 wt.-% of at least one hydrocarbon petroleum (tackifying) resin,
5-40 wt.-% of at 25° C. liquid polybutene,
10-70 wt.-% of mineral fillers, and
0.1-5 wt.-% of additives, including antioxidants, thermal stabilizers, and color pigments Adhesive4: Ethylene-propylene copolymer based adhesive sealant (SikaLastomer SL-70, available from Sika Automotive USA)

Watertightness Test

The suitability of the prepared sealing devices for use in sealing of overlap joints, connections, and details in membrane based waterproofing systems was determined with a watertightness test as described below.

First a circular hole having a diameter of ca. 1 cm was punched into middle of a strip of a waterproofing membrane. The waterproofing membrane consisted of a waterproofing layer having a thickness of ca. 1.2 mm and a functional layer having a thickness of ca. 0.4 mm and it was prepared using the same procedure as described above without application of the adhesive layer. The hole was punched through the whole thickness of the waterproofing membrane. The waterproofing membrane was then laid on a surface of a concrete substrate with the functional layer facing upwards and a 15×15 cm strip of a sealing device was applied over the hole such that the adhesive layer was contacted with the functional layer of the waterproofing membrane. The sealing device was subsequently pressed against the outer upward facing surface of the waterproofing membrane to affect adhesive bonding between the functional layer of the waterproofing membrane and the waterproofing layer of the sealing device. The thus obtained test specimen comprised the waterproofing membrane and the sealing device adhesive bonded to each other with the adhesive layer of the sealing device.

The test specimen was then turned over and laid on a surface of a concrete substrate with the waterproofing layer of the waterproofing membrane facing upwards. A pipe having a diameter of 5 cm and a length of 30 cm was mounted vertically over the hole and the pipe was filled completely with water. The connection between the pipe and surface of the waterproofing membrane was made watertight by using an adhesive coating. The level of water in the pipe was measured after pre-determined periods of time to determine the joint between the waterproofing membrane and the sealing device was still watertight or if a leakage had occurred. The results of the watertightness test are presented in Table 1.

TABLE 1

| Adhesive type | Layer thickness | Initial adhesion | Watertight for |
|---|---|---|---|
| Adhesive1 | 1.0 mm | High | >7 days |
| Adhesive2 | 0.85 mm | High | <7 days |
| Adhesive3 | 1.0 mm | Low | >7 days |
| Adhesive4 | 1.0 mm | Low | Not watertight |

According to the test results, the sealing devices with a layer of the UV-curable acrylic-based pressure sensitive adhesive and the butyl rubber-based pressure sensitive hot-melt adhesive perform better in terms of watertightness compared to the sealing devices with a layer of the thermoplastic elastomer-based pressure sensitive hot-melt adhesive or the ethylene-propylene copolymer based adhesive sealant. Such sealing devices are, therefore, more suitable for use in sealing of overlap joints, connections, and details in membrane based waterproofing systems.

The invention claimed is:

1. A sealing device in the form of a tape comprising a waterproofing layer having first and second major surfaces and comprising at least one thermoplastic polymer P1 and a functional layer having first and second major surfaces and comprising:
   a) 10-70 wt.-% of at least one thermoplastic polymer P2 and
   b) 30-90 wt.-% of at least one solid particulate filler F, the proportions being based on the total weight of the functional layer, wherein
   the functional layer and the waterproofing layer are directly connected over at least part of their opposing major surfaces and wherein the sealing device further comprises an adhesive layer coated on and at least partially covering the first major surface of the waterproofing layer opposite to side of the functional layer.

2. The sealing device according to claim 1, wherein the particles of the at least one solid particulate filler F are distributed throughout the entire volume of the functional layer.

3. The sealing device according to claim 1, wherein the adhesive is a rubber-based adhesive comprising at least one elastomer selected from the group consisting of butyl rubber, halogenated butyl rubber, ethylene-propylene rubber, ethylene-propylene diene monomer rubber, natural rubber, chloroprene rubber, synthetic 1,4-cis-polyisoprene, polybutadiene, and isoprene-butadiene copolymer.

4. The sealing device according to claim 3, wherein the at least one elastomer is present in the rubber-based adhesive in an amount of 5-70 wt.-% based on the total weight of the adhesive and wherein the rubber-based adhesive further comprises at least one tackifying resin and at least one at 25° C. liquid polyolefin resin and/or at least one filler.

5. The sealing device according to claim 1, wherein the adhesive is an acrylic-based adhesive comprising at least one acrylate polymer.

6. The sealing device according to claim 5, wherein the at least one acrylate polymer has been prepared by using a monomer mixture comprising at least 65 wt.-% of acrylic monomers of the formula (I);

where $R_1$ is a hydrogen or a methyl group and $R_2$ is a hydrogen or an alkyl group having from 2 to 30 carbon atoms.

7. The sealing device according to claim 5, wherein the adhesive is an at least partially crosslinked acrylic-based adhesive.

8. The sealing device according to claim 5, wherein the adhesive is an at least partially crosslinked composition of:
   a') at least 65.0 wt.-% of the at least acrylate polymer,
   b') 0.01-5.0 wt.-% of at least one curing agent,
   c') 0.1-5.0 wt.-%, of at least one initiator, and
   d') 0-30.0 wt.-% of at least one tackifying resin, all proportions being based on the total weight of the composition.

9. The sealing device according to claim 8, wherein the at least one initiator c') is a photo-initiator.

10. The sealing device according to claim 1, wherein the adhesive layer has a thickness of 0.1-2.5 mm.

11. The sealing device according to claim 1 further comprising a release liner at least partially covering the outward facing surface of the adhesive layer opposite the side of the waterproofing layer.

12. The sealing device according to claim 1, wherein the thermoplastic polymers P1 and P2 are selected from the group consisting of ethylene-vinyl acetate copolymer (EVA), ethylene-acrylic ester copolymers, ethylene-α-olefin co-polymers, ethylene-propylene co-polymers, propylene-α-olefin co-polymers, propylene-ethylene copolymers, polypropylene (PP), polyethylene (PE), polyvinylchloride (PVC), polyethylene terephthalate (PET), polystyrene (PS), polyamides (PA), chlorosulfonated polyethylene (CSPE), ethylene propylene diene rubber (EPDM), and polyisobutylene (PIB) and/or the at least one solid particulate filler F is selected from the group consisting of inert mineral fillers and mineral binders.

13. A method for producing a sealing device according to claim 1 comprising steps of:
   i) extruding and/or calendering and/or co-extruding compositions of the waterproofing layer and the functional layer to form a membrane composite,
   ii) providing an adhesive composition and optionally heating the adhesive composition to allow the adhesive composition to flow, and
   iii) coating adhesive composition onto the first major surface of the waterproofing layer opposite the side of the functional layer such that the first major surface of the waterproofing layer is at least partially covered by an adhesive layer.

14. The method according to claim 13, wherein the adhesive composition is an UV-curable acrylic-based pressure sensitive adhesive and wherein the method comprises a further step of:
   iv) subjecting the adhesive layer to UV-radiation to effect crosslinking of the adhesive composition.

15. The method according to claim 13 comprising a further step of:
   v) applying a release liner to the outward facing surface of the adhesive layer opposite the side of the waterproofing layer.

16. A method for waterproofing a substrate comprising steps of:
   i) providing first and second waterproofing membranes having inner and outer surfaces,
   ii) positioning the waterproofing membranes on surface of the substrate such that the inner surfaces of the membranes are facing the surface of the substrate and the end portions of the membranes are overlapped to form a lapped joint between the membranes,
   iii) applying the sealing device according to claim 1 to and over the lapped joint such that the adhesive layer is directly contacted with at least portion of the outer surface of the first and second membrane on both sides of the lapped joint, and
   iv) pressing sealing device against the outer surfaces of the waterproofing membranes with a pressure sufficient to affect adhesive bonding.

17. A method comprising applying the sealing device according to claim 1 to seal lapped joints formed between overlapping portions of polymeric membranes.

\* \* \* \* \*